W. ROBERTS.
BATTERY PLATE.
APPLICATION FILED MAR. 17, 1921.

1,414,710.

Patented May 2, 1922.

William Roberts
INVENTOR.

BY
ATTORNEY.

UNITED STATES PATENT OFFICE.

WILLIAM ROBERTS, OF AKRON, OHIO, ASSIGNOR OF TWO-THIRDS TO FRANK T. LAHEY, OF AKRON, OHIO.

BATTERY PLATE.

1,414,710.

Specification of Letters Patent.  Patented May 2, 1922.

Application filed March 17, 1921. Serial No. 453,123.

*To all whom it may concern:*

Be it known that I, WILLIAM ROBERTS, a citizen of the United States, residing at Akron, in the county of Summit and State of Ohio, have invented certain new and useful Improvements in Battery Plates, of which the following is a specification.

This invention relates to the manufacture of plates for use in storage batteries and is designed to improve upon the design of plates now in use enabling a greater quantity of the paste to be held and retained in the plates. It is also an object of the invention to construct a battery plate which will more securely hold the paste and be more efficient than those previously designed. It is also an object of the invention to provide a substitute for the generally used sheetwood separators.

In the drawings is shown one form of battery plate such as is included within the scope of my invention, such showing being representative merely and not to be understood as embodying all forms of the invention, as changes and modifications may be made without departing from the invention.

Fig. 1 of the drawings shows a single element of the battery in elevation.

Figure 1:
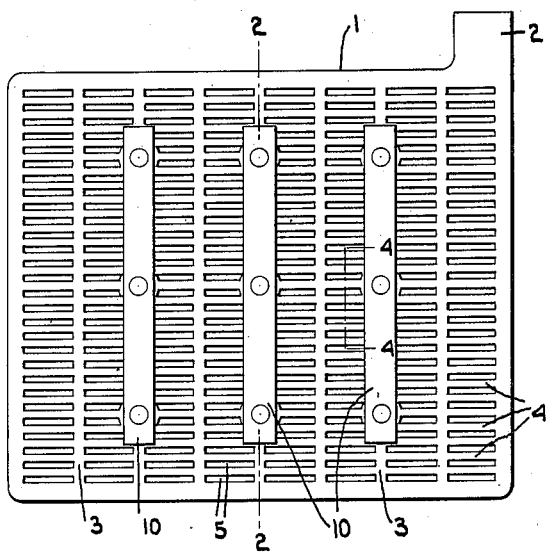
Figure 2:
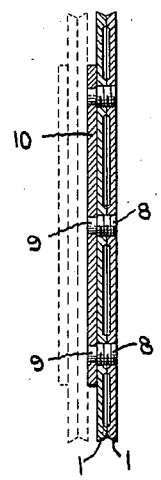
Fig. 2 is a section on the line 2—2 of Fig. 1.

The single element or plate of the battery shown in the drawing is in reality composed of a plurality of plates, preferably two plates, placed face to face, the plates being of a grid-like construction secured together in opposing relationship, the grid-work being so designed as to enable a large quantity of the paste to be securely retained.

Figure 4:
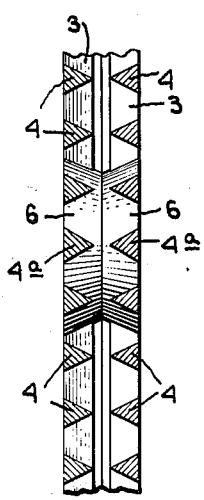
Fig. 4 is an enlarged cross section on line 4—4 of Fig. 1.
Figure 3:
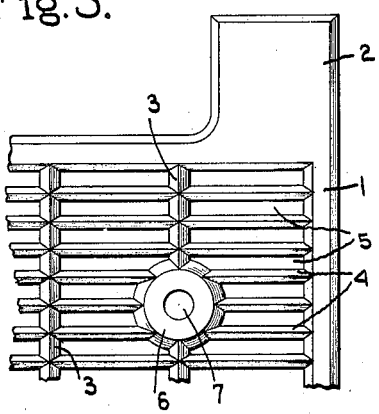
Fig. 3 is an enlarged view of one of the units of the battery element showing a fragmentary portion only with an abutment shown in a different position from that shown in Fig. 1.

The battery plate is shown at 1 and is of the usual shape provided with the terminal 2, the plate being made of the usual lead alloy. The grid-work of the plate is made up of a number of spaced parallel vertical ribs or bars 3 and a plurality of spaced horizontal bars 4, the preferred arrangement being as shown so that a number of elongated rectangular openings 5 are provided. The ribs are shown as triangular in cross-section the bases of the triangles being flush with one surface of the plate. When the two plates to form a single battery element are placed together the apexes of the triangles face each other as shown in Fig. 4. It will be understood that the triangular shape of the bars is not essential to this invention and although bars of this shape are admirably suited for the purpose, other cross sections may be employed for this portion of the plate.

Suitably distributed over the plate in parallel rows, preferably spaced equidistantly, are a number of formations or buttons 6, into which the ribs or bars are merged, these buttons being frusto-conical in shape, pointing in the same direction as the ribs and extending slightly above the tops or apexes of the bars or ribs, so that the buttons form spacers to hold the two plates slightly apart, providing a space between the edges of the bars, although the spacing of the ribs is small and in fact is not essential for accomplishing the purposes of the invention.

Through the buttons or abutments are tapped screw threaded holes 7 in which are received short screw threaded pins or fasteners 8 which hold the plates together. These pins are preferably made of hard rubber and are provided with extended studs 9, and these studs being provided for the reception of the separators.

The separators may be of any desired form it being one of the objects of this invention to provide a suitable substitute for the ordinary wood separators now used in storage batteries. In the form shown in this application I make use of strips of hard rubber 10 laid over the extended ends of the securing pins. It would be practicable to rely upon the studs 9 as separators, except that deposits are liable to form or build upon these extended ends and might be objectionable.

Certain of the ribs forming the grid-work may be made slightly heavier or thicker than others to strengthen the plate, this being illustrated in Fig. 4, in which the ribs 4ª are shown as slightly larger than the other ribs.

Having described the form of battery plate shown herein, it will be understood that I am not confined to exact details or arrangement and proportion of the parts, but am permitted to vary such details within the scope of my invention.

By forming the plates with the long, narrow rectangular openings 5, I am enabled to obtain a large percentage of access to the active material and a maximum contact is provided between the active material and the body of the plates. The plates here shown are light and strong and are suitable for use in automobiles. The area of the openings is much larger than in former plates of similar battery constructions, particularly that shown in my prior Patent No. 414,953 of Nov. 12, 1889. The construction shown herein will provide a more efficient and lighter battery than batteries which have preceded this one.

It is only necessary to state that the double plate shown is admirably suited for use in storage batteries, the space between the apexes of the triangular bars and the rectangular openings between the bars serving to securely hold and retain a large amount of the paste. The paste may conveniently be applied to the battery element after the two plates are assembled. It will be seen that by the shape of the plate a maximum exposure of the active material of the battery is obtained, and furthermore, there is no tendency for any of the material to be shaken from the plate and lost, as any which is loosened will not tend to fall out, but will be retained in the element by the tapering or downwardly inclined surfaces of the bars composing the grid-work. The apexes of the bars are placed in opposition so that the material is trapped and held by the converging upper surfaces of the bars.

I claim—

1. A battery element comprising two plates separated from each other, a plurality of horizontal and vertical ribs in said plates, the ribs intersecting to form elongated rectangular openings and a plurality of isolated abutments on said plates said abutments extending above the plane of the ribs and forming spacing members between the plates and means for securing the plates together with the abutments in contact.

2. A battery element comprising two plates separated from each other, a plurality of ribs on said plates, said ribs intersecting to form long narrow openings and means to secure said plates together with the ribs in opposition but separated from contact, comprising isolated abutments on one of said plates raised above the plane of the ribs and means to hold the plates together with the abutments contacting the opposite plate forming spacing members between the plates.

3. A battery element comprising two plates, each of said plates comprising intersecting ribs, a plurality of isolated integral abutments distributed over the surface of the plate, the abutments projecting above the plane of the ribs, and means to hold the said plates together with the abutments in contact.

4. A battery plate, a plurality of insulating members projecting from the plate, and bars of insulating material entirely supported by said insulating members.

5. A battery plate, a plurality of hard rubber pins projecting from the plate and a hard rubber strip entirely supported by the pins and acting as a separator.

6. A battery element comprising two plates, means to space the two plates apart, comprising a plurality of abutments on one of said plates projecting above the surface of the plate and contacting the other plate, and insulating pins passing through said plates at the abutments.

7. A battery element comprising two plates, means to space the two plates apart, comprising a plurality of abutments on one of said plates projecting above the surface of the plate and contacting the other plate, and insulating pins passing through said plates.

8. A battery element comprising two plates, means to space the two plates apart comprising a plurality of abutments on one of said plates projecting above the surface of the plate and contacting the other plate, and insulating pins passing through said plates.

9. A battery element comprising two plates, means to space the two plates apart comprising a plurality of abutments on one of said plates projecting above the surface of the plate and contacting the other plate, insulating pins passing through said plates and separating strips received over the pins.

10. A battery element comprising two plates, formed of a plurality of intersecting ribs, said ribs being triangular in cross section, the apices of the ribs being on the inside of the element, a plurality of enlarged isolated formations distributed over the surface of the plates, said formations being in contact, pins passing through the formations on said plates and serving to connect them together.

11. A battery element comprising two plates, formed of a plurality of intersecting ribs, said ribs being triangular in cross section, the apices of the ribs being on the inside of the element, a plurality of enlarged isolated formations distributed over the surface of the plates, said formations being in contact, pins passing through the formations on said plates and serving to connect them together, and insulating separating strips on the pins.

WILLIAM ROBERTS.